Patented Aug. 9, 1938

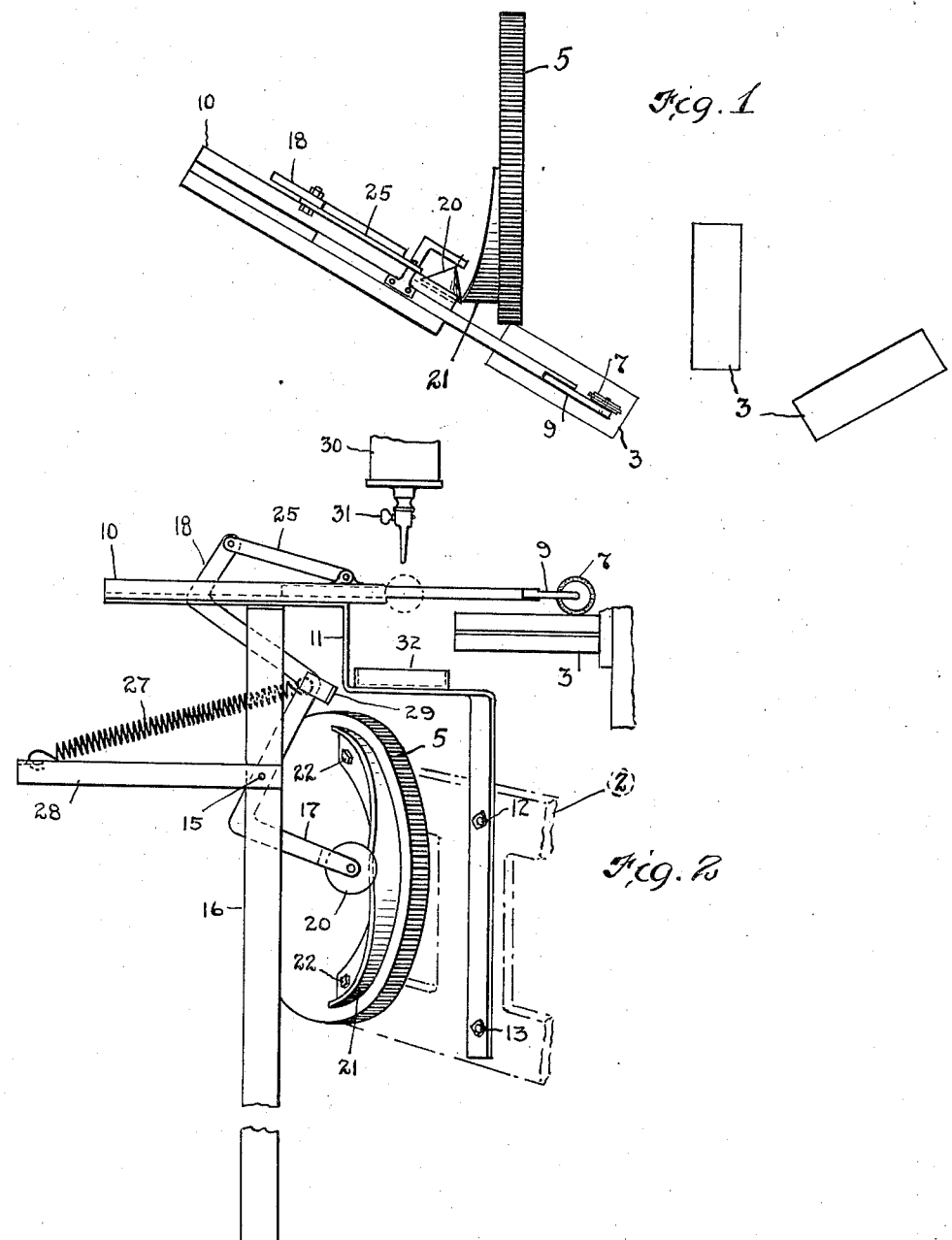

2,126,598

UNITED STATES PATENT OFFICE 2,126,598

MECHANISM FOR SOLDERING MACHINERY

George M. Ambrosius, Lakewood, Ohio, assignor to The Standard Oil Company (Ohio), Cleveland, Ohio, a corporation of Ohio Application June 15, 1935, Serial No. 26,882

4 Claims. (Cl. 113—95)

In solder-seaming machinery, a particular source of difficulty has been the application of flux satisfactorily. If flux could be applied to a seam line in just the right amount of uniformity, the soldering operation is simple and a tight seam assured. However, the general tendency has been that if a sufficient rate of application was adjusted for the beginning of the seam, the portion further along was prone to be deficiently fluxed, and a consequent unsatisfactory spread of solder ensued. If adjustment was made so that an ample supply of flux reached the far end of the seam line, too much was likely to be applied at the beginning of the seam. Surplus spread of flux means waste of solder, besides general mussiness which is very objectionable in finished products. In accordance with the present invention, flux solution may be applied accurately and uniformly along the line to be seamed, and at the same time, unduly rapid wear of applicator parts is obviated. Furthermore, an attachment mechanism is made available which can be applied in new installations or in replacement or repair installations, easily and with particular advantage. Other objects and advantages will appear as the description proceeds.

To the accomplishment of the foregoing and related ends, the invention, then, comprises the features hereinafter fully described, and particularly pointed out in the claims, the following description and the annexed drawing setting forth in detail certain illustrative embodiments of the invention, these being indicative however, of but a few of the various ways in which the principle of the invention may be employed.

In said annexed drawing—

Fig. 1 is a plan view of an embodiment of the invention; and Fig. 2 is a side elevation.

The seam to be soldered, as for instance a body side seam of a can, is presented by means which have preliminarily formed the can, and brought it to position for the application of flux and the soldering operation. The detail as to the construction of the forming mechanism is immaterial to the present invention, and it is sufficient here to point out that it may involve framing 2, with traveling means presenting can-body carrying horns 3 in succession as driven by drive means including drive-gear 5 which is concerned with the movement-rate of the bodies. In a position to be reciprocated in and out along the seam line on the can body as presented by the horn 3 is the flux-applicator including an absorbent member 7, as a brush or felt, preferably a wheel, carried by an arm 9 and suitably guided in accurate path to conform to the line of the seam longitudinally of the can body. For this, a guide, preferably of channel character 10 is mounted on a bracket 11 which is bolted to the framing 2 at suitable points 12, 13. Pivoted at a point 15 on an adjacent standard 16, which may also help to support the bracket 11, is a double angle lever 17, 18. The arm 17 thereof is provided with a cam-engaging roller 20, which projects into the path of a cam-segment 21. This cam-segment may be a part of the drive-gear 5, as in new installations, or for attachment use, it preferably is a cam-segment bolted onto the gear-wheel 5, as by bolts 22. The arm 18 of the lever is connected by a link 25 to the reciprocable arm 9. The latter thus is reciprocated in and out along the can body seam, at each presentment of a can body by the traveling head. To insure uniform rate movement, the weight in the angle lever 17, 18, may be suitably distributed, or preferably a spring 27 may be secured to suitable anchorage, as a projection 28 on standard 16 and be attached at its other end to the lever 17, 18. A stop which may be in the form of a lateral lug 29 is desirably arranged to limit excess of excursion against standard 16.

In the path of the absorbent wheel 7, and most advantageously at a point thereover in the inactive or out position of its excursion of movement, is a flux solution reservoir 30. This is desirably arranged with a sight feed glass and control valve 31, whereby the rate of feed may be accurately regulated. Under the reservoir and the path of the absorbent wheel is a drip pan 32.

In operation, the can bodies to be seam-soldered are fed in succession by the moving horn—carrier or mandrel-carrier, and each body in turn is presented in alignment with the flux applicator. Timed in sequence with this movement, the cam on the drive gear or indexing gear 5, engaging the roller 20 throws the lever 17, 18, to push the reciprocating arm 9 inwardly, as directed by its guide 10, and the absorbent wheel 7 is moved from its position under the flux reservoir 30, to roll longitudinally of the seam to be soldered, and thence back. Such to and fro movement or successive reverse pass over the seam path insures a particular accuracy of flux distribution. The arm 9 and applicator wheel 7 are thus returned to position under the flux reservoir 30, and with the further movement of the can-carrying means, a new can body is presented, and the cycle of movement of the applicator wheel 7 over its seam-line is again gone through, and so on.

Other modes of applying the principle of the invention may be employed, change being made as regards the details described, provided the means stated in any of the following claims, or the equivalent of such, be employed.

I therefore particularly point out and distinctly claim as my invention:

1. In soldering machinery, means including drive gears for moving a formed sheet metal article into position to be seam-soldered, a cam on one of said drive gears, means for removably securing said cam to said gear, a lever operated by said cam, an arm reciprocated by said lever, an absorbent flux applicator wheel connected to said arm and reciprocated into active and inactive positions relative to the seam to be soldered, a solution reservoir over the inactive portion of the path of said absorbent wheel, and a drip pan in line thereunder.

2. In soldering machinery, means including drive gears for moving a formed sheet metal article into position to be seam-soldered, a cam on one of said drive gears, a lever operated by said cam, an arm reciprocated by said lever, an absorbent flux applicator wheel connected to said arm and reciprocated into active and inactive positions relative to the seam to be soldered, a solution reservoir over the inactive portion of the path of said absorbent wheel, and a drip pan in line thereunder.

3. In soldering machinery, means for moving a formed sheet metal article into position to be seam-soldered, a lever operated in timed relation therewith, drive means and a cam removably secured to the drive means for operating said lever, an arm reciprocated by said lever, an absorbent flux applicator reciprocated by said arm in a path of approach toward the seam to be soldered and then along such seam, a solution reservoir over the first-named portion of the path of said applicator in a position out of the way at the side of the line of travel of the articles to be soldered, and a drip pan in line under said reservoir and said applicator-path.

4. In soldering machinery, means for moving a formed sheet metal article into position to be seam-soldered, an absorbent flux applicator wheel reciprocable in a path of approach toward the seam to be soldered and then along such seam, a solution reservoir over the first-named portion of such path and a drip pan under the same, and means for reciprocating said absorbent flux applicator, whereby the flux applicator is moved alternately between the drip pan and the seam.

GEORGE M. AMBROSIUS.